(12) United States Patent
Cracraft

(10) Patent No.: US 11,295,037 B2
(45) Date of Patent: Apr. 5, 2022

(54) DATA SCANNING AND REMOVAL FOR REMOVABLE STORAGE DEVICE

(71) Applicant: International Business Machines Corporation, Armonk, NY (US)

(72) Inventor: Michael Cracraft, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 16/423,228

(22) Filed: May 28, 2019

(65) Prior Publication Data
US 2020/0380174 A1 Dec. 3, 2020

(51) Int. Cl.
| | |
|---|---|
| G06F 1/26 | (2006.01) |
| G06F 11/00 | (2006.01) |
| G08B 13/00 | (2006.01) |
| G08B 21/00 | (2006.01) |
| G08B 29/00 | (2006.01) |
| G06F 21/78 | (2013.01) |
| G06F 21/57 | (2013.01) |
| G06F 21/88 | (2013.01) |
| G06F 21/62 | (2013.01) |

(52) U.S. Cl.
CPC ............ *G06F 21/78* (2013.01); *G06F 21/575* (2013.01); *G06F 21/6245* (2013.01); *G06F 21/88* (2013.01)

(58) Field of Classification Search
CPC ........ G06F 21/78; G06F 21/575; G06F 21/88; G06F 21/6245; G06F 2221/2143; G06F 21/79
See application file for complete search history.

(56) References Cited

U.S. PATENT DOCUMENTS

| | | | |
|---|---|---|---|
| 9,239,909 B2 | 1/2016 | Tedesco et al. | |
| 9,419,841 B1 | 8/2016 | Kozolchyk et al. | |
| 10,097,535 B1 | 10/2018 | Huang | |
| 10,338,845 B1* | 7/2019 | Singh | G06F 3/0637 |
| 2004/0158674 A1* | 8/2004 | Cloutier | G06F 3/0619 |
| | | | 711/115 |
| 2007/0192869 A1* | 8/2007 | Garfinkle | G08B 21/0269 |
| | | | 726/26 |
| 2010/0037319 A1 | 2/2010 | Steeves et al. | |

(Continued)

OTHER PUBLICATIONS

Labarge et al., . "An automated system for rapid and secure device sanitization." Computers & Security 42 (2014):77-91.

(Continued)

*Primary Examiner* — Amie C. Lin
(74) *Attorney, Agent, or Firm* — Cantor Colburn LLP; Edward Wixted

(57) ABSTRACT

Techniques for data scanning and removal for a removable storage device are described herein. An aspect includes a removable storage device comprising an embedded processor configured to boot from an embedded read-only memory (ROM) of the removable storage device. Another aspect includes scanning an internal storage of the removable storage device to identify a first file in the internal storage that matches removal criteria defined in the embedded ROM. Another aspect includes removing the identified first file from the internal storage of the removable storage device.

21 Claims, 9 Drawing Sheets

(56) References Cited

U.S. PATENT DOCUMENTS

| | | | |
|---|---|---|---|
| 2011/0231607 A1* | 9/2011 | Gao | G06F 21/78 |
| | | | 711/115 |
| 2016/0188249 A1* | 6/2016 | Kang | G06F 21/80 |
| | | | 711/112 |
| 2017/0075607 A1* | 3/2017 | Wu | G06F 3/0622 |
| 2017/0111345 A1 | 4/2017 | Heiman et al. | |

OTHER PUBLICATIONS

Matson et al., "The 'how' and 'why' of persistent information security." Proceedings of the 2006 International Conference on Privacy, Security and Trust: Bridge the Gap Between PST Technologies and Business Services. ACM, 2006. pp. 1-4.

Teymourlouei, "Preventative Measures in Cyber & Ransomware Attacks for Home & Small Businesses' Data." Proceedings of the International Conference on Scientific Computing (CSC). The Steering Committee of The World Congress in Computer Science, Computer Engineering and Applied Computing (WorldComp), 2018. pp. 1-7.

* cited by examiner

DATA SCANNING AND REMOVAL FOR REMOVABLE STORAGE DEVICE

BACKGROUND

The present invention generally relates to computer systems, and more specifically, to data scanning and removal for a removable storage device for use in conjunction with a computer system.

Removable storage devices, such as universal serial bus (USB) drives, are widely used for carrying and transferring data between computers. A removable storage device may even be used as a primary storage. Thus, many types of data are stored on removable storage devices, and some of the data may be critical. A user of a removable storage device may also use a removable storage device as backup storage. Any kind of documents, programs and applications may be stored in a removable storage device. Confidential information in removable storage devices may be protected by disk passwords and/or cryptographic approaches. However, a removable storage device may not provide an embedded access control. The type of file system that is used on a removable storage device may be are determined by an operating system of an attached host computer. Some examples of file system types include FAT (File Allocation Table), FAT32, New Technology File System (NTFS), ext2 (Second Extended File System), ext3 (Third Extended File System), etc. Some of these file systems do not support access control, such as FAT32. While some other file systems can provide an access control function, when a removable storage device with such a file system is mounted to another computer, a privileged user of the new host may access any data of the removable storage device.

There may be other security concerns regarding removable storage devices. The portability of removable storage devices allows data to be processed by computer systems that are not connected to a computer network. For example, some legacy computer systems, such as scientific instruments and computers, may be either unable to connect to a network, or may be restricted from network connectivity due to security vulnerabilities that may be present in some older systems. Some such systems may not be capable of supporting applications that are needed to connect to remote network data storage such as cloud services. These systems may require removable storage devices to transfer information to or from the host system via a physical interface (e.g., a USB port) for processing. For example, waveform and screen captures of signals on an oscilloscope may be stored on a removable storage device for transfer to a different, more powerful computer for analysis. However, data that is transferred to an from such a computer system may be critical or sensitive data.

SUMMARY

According to an embodiment described herein, a system can include a removable storage device including an embedded processor configured to boot from an embedded read-only memory (ROM) of the removable storage device. The embedded processor can also scan an internal storage of the removable storage device to identify a first file in the internal storage that matches removal criteria defined in the embedded ROM. The embedded processor can also remove the identified first file from the internal storage of the removable storage device.

According to another embodiment described herein, a method can include booting an embedded processor of a removable storage device from an embedded read-only memory (ROM) of the removable storage device. The method can also include scanning an internal storage of the removable storage device to identify a first file in the internal storage that matches removal criteria defined in the embedded ROM. The method can also include removing the identified first file from the internal storage of the removable storage device.

According to another embodiment described herein, a computer program product can include a computer readable storage medium having program instructions embodied therewith, the program instructions executable by an embedded processor of a removable storage device to cause the embedded processor to perform a method including booting from an embedded read-only memory (ROM) of the removable storage device. The method can also include scanning an internal storage of the removable storage device to identify a first file in the internal storage that matches removal criteria defined in the embedded ROM. The method can also include removing the identified first file from the internal storage of the removable storage device.

According to an embodiment described herein, a system, method, or computer program product can include a removable storage device including a location-based erase module configured to, based on receiving a signal from a scanner, reset an erase timer. The location-based erase module can also, based on expiration of the erase timer, trigger an embedded processor of the removable storage device to perform a full erase of an internal storage of the removable storage device.

According to an embodiment described herein, a system, method, or computer program product can include a removable storage device including a location-based erase module configured to determine a location of the removable storage device based on a global positioning system (GPS) module. The location-based erase module can also compare the determined location to a predetermined area. The location-based erase module can also, based on the determined location being outside of the predetermined area, trigger an embedded processor of the removable storage device to perform a full erase of an internal storage of the removable storage device.

According to another embodiment described herein, a device can include an embedded processor that boots from an embedded read-only memory (ROM) of the device. The embedded processor can also scan an internal storage of the device to identify a first file in the internal storage that matches removal criteria defined in the embedded ROM. The embedded processor can also remove the identified first file from the internal storage of the device.

DETAILED DESCRIPTION

Figure 1:
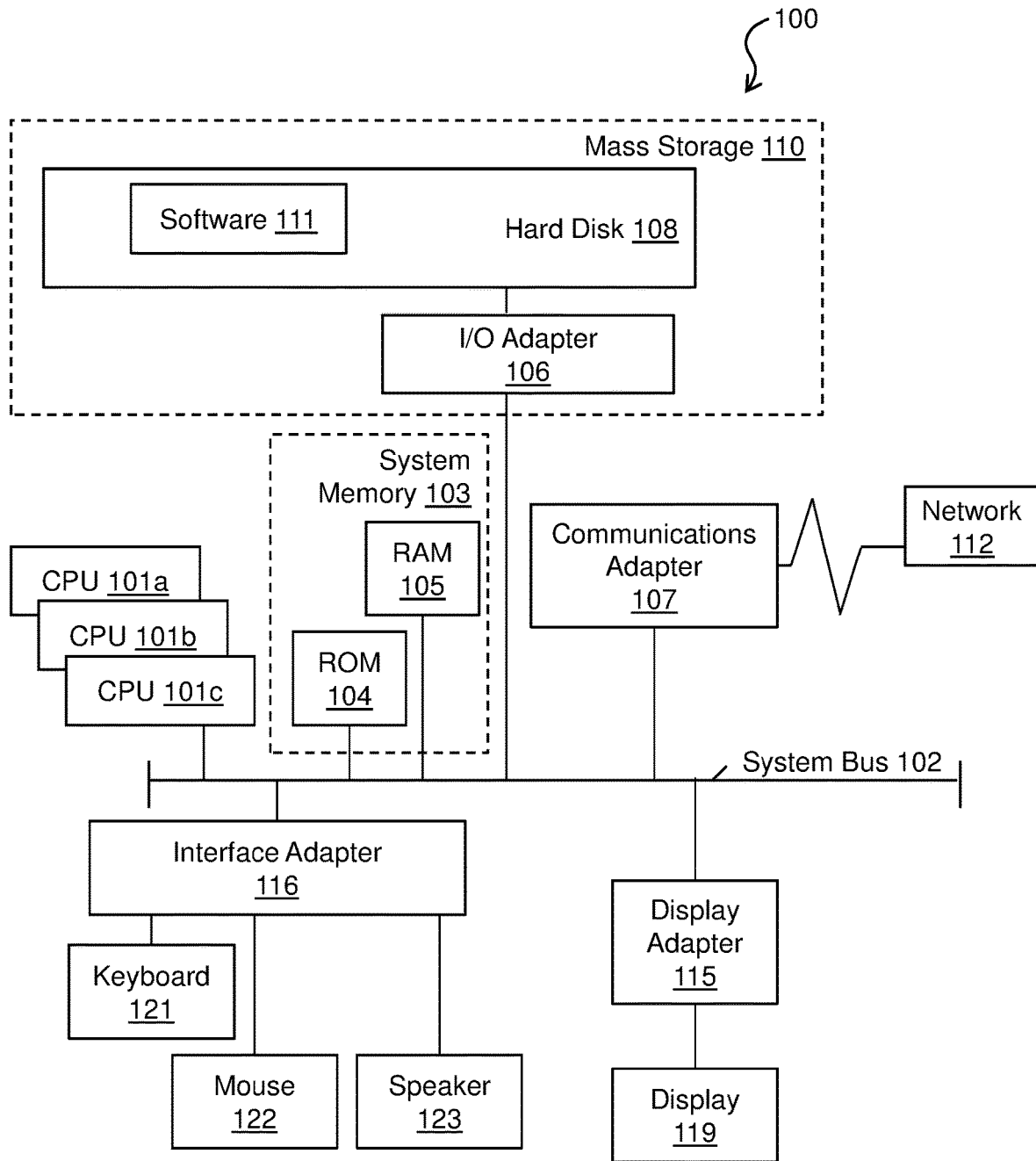
FIG. 1 is a block diagram of an example computer system for use in conjunction with one or more embodiments of data scanning and removal for a removable storage device.

One or more embodiments of the present invention provide data scanning and removal for a removable storage device. Prevention of storage of data that includes sensitive personal information (SPI) on removable storage devices may be necessary, as the portability of such storage devices may violate security policies for SPI. However, because some host computer systems may require usage of removable storage devices in order to transfer data to and from such a host system, a removable storage device may prevent storage of SPI on the removable storage device. Embodiments of a removable storage device may include an embedded system that implements data scanning and removal using an embedded processor and a read-only memory (ROM). The embedded system may perform a scan of data in the internal memory of the removable storage device to identify and remove SPI. Embodiments of a removable storage device including data scanning and removal may include any appropriate type of external memory device, including but not limited to universal serial bus (USB), serial advanced technology attachment (SATA), small computer system interface (SCSI), and peripheral component interconnect express (PCIe). Embodiments of data scanning and removal for a removable storage device may ensure that security policies for SPI (e.g. in order to comply with data privacy laws such as the General Data Protection Regulation in the European Union, or the Health Insurance Portability and Accountability Act in the United States) are not violated by a user of a removable storage device, and may allow the continued use of legacy host computing systems, such as scientific instruments, that may not be connected to a computer network and therefore rely on removable storage devices for data transfer.

In some embodiments, loss of external power from the host machine by the removable storage device may cause the embedded processor to boot from the embedded ROM to perform the scan. In some embodiments, a removable storage device may include an auxiliary power source that powers the embedded processor after removal of the removable storage device from the external power of the host system. The auxiliary power source may ensure that SPI is removed from the removable storage device by the embedded processor if a user removes the removable storage device from the host system without proper ejection. In some embodiments, the embedded processor may periodically scan and remove files that may contain SPI from the removable storage device during operation of the removable storage device (e.g., while the removable storage device is connected to and powered by the host system), in addition to performing a final scan and removal based on ejection or loss of power.

The scan that is performed by the embedded processor may determine the presence of SPI in the internal memory of the removable storage device in any appropriate manner. Any files determined to potentially contain SPI may be identified and removed from the removable storage device. The removal may include unlinking and overwriting the location of an identified file in some embodiments. In some embodiments, a list of file identifiers corresponding to the removed files may be stored in a predetermined memory location in the removable storage device. If a file identifier is determined to include SPI (e.g., a name, phone number, address, or social security number), any sensitive portion of the file identifier may be masked in the file identifier list (e.g., replaced with x's or some other character).

In some embodiments, the embedded processor may examine the contents of all stored files in the removable storage device to determine any file that could contain SPI. In some embodiments, the embedded processor may examine the contents of files having recognized file types for potential SPI information, e.g., identify any patterns matching phone numbers, social security numbers (SSNs), names, address, etc. In some embodiments, the embedded processor may include a neural network that has been trained to recognize SPI patterns within files. In some embodiments, a neural network that is executed by the embedded processor may be trained using binary and text data to recognize SPI patterns. In some embodiments, the training data may include excerpts of medical records or similar types of data.

In some embodiments, the embedded processor may delete any files having a type that is not on a predetermined list of allowed file types from the removable storage device. In some embodiments, the embedded processor may identify and remove any file types that might contain SPI based on the file extensions (e.g., any files of type .txt, .doc, .ppt, .xls, .odf, etc. may be deleted). In some embodiments, the embedded processor may check the header of a file to determine the type of a file, rather than relying on the file extension. In various embodiments, the embedded processor may allow only certain types of files on the removable storage device, or may deny specific types of files. A list of file types that are allowed, or not allowed, on the removable storage device may be defined via a one-time programmable (OTP) function of the embedded ROM in the removable storage device in some embodiments. For example, a host system comprising a scientific instrument may only process certain types of files; therefore, a removable storage device for use in conjunction with the host system may only allow the types of files that are processed by the host system. A file of any other file type may be deleted from the removable storage device based on detection of a file operation involving the file. In such embodiments, the embedded processor may actively monitor the contents of the removable storage device throughout operation of the removable storage device, in addition to performing a final scan and file removal based on ejection or loss of power.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units, i.e., CPUs 101*a*, 101*b*, 101*c*, etc. (collectively or generically referred to as processor 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
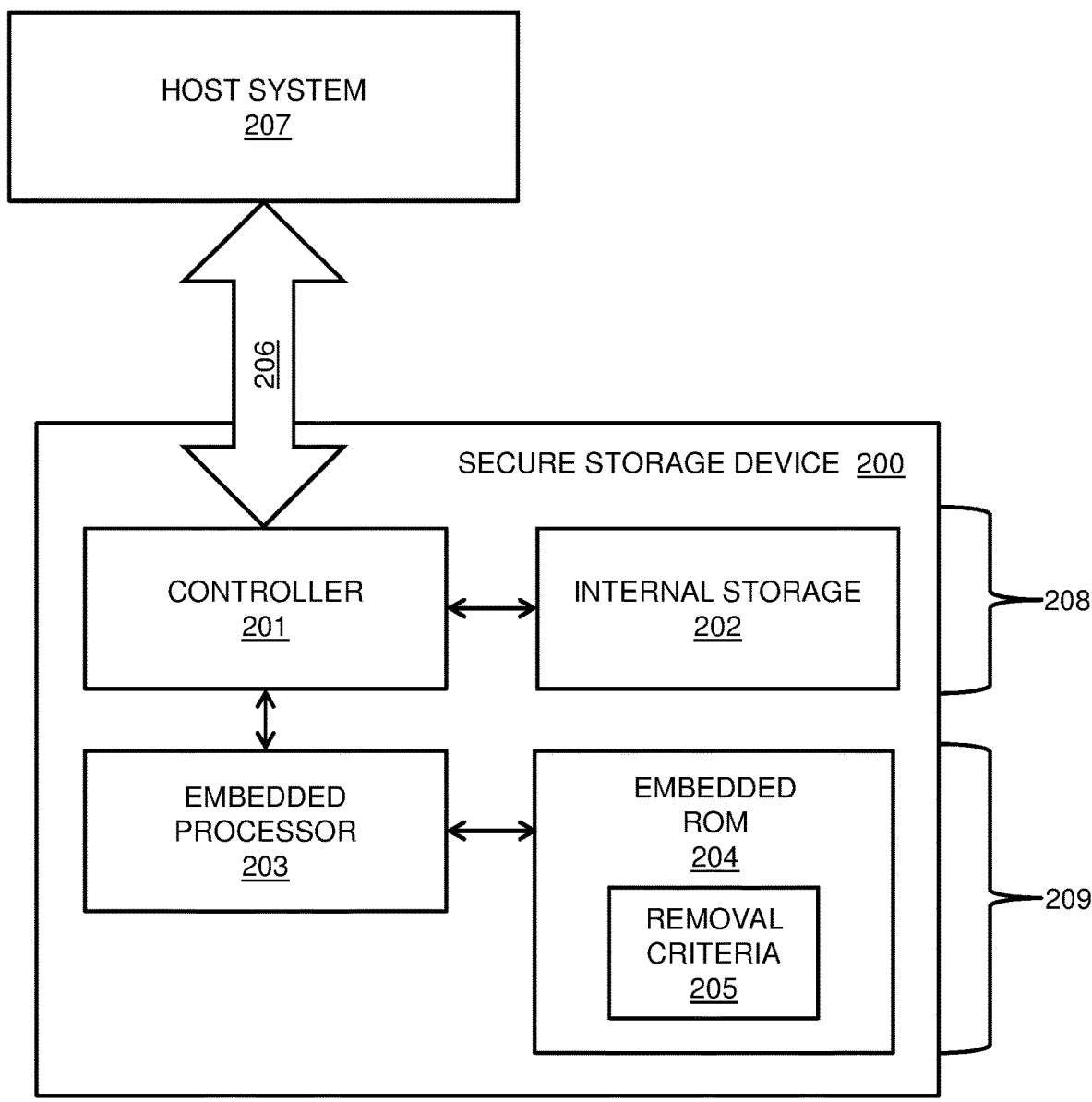
FIG. 2 is a block diagram of a removable storage device including data scanning and removal in accordance with one or more embodiments of the present invention.

FIG. 2 is a block diagram of a removable storage device 200 including data scanning and removal in accordance with one or more embodiments of the present invention. Device 200 may be used in conjunction with any appropriate host computer system 207, which may include any elements discussed above with respect to computer system 100 of FIG. 1. Device 200 may be any appropriate type of memory device, including but not limited to USB, SATA, SCSI, and PCIe. Device 200 includes a controller 201 that is in communication with a host system 207 via interface 206. The device 200 may be powered by host system 207 via interface 206. The host system 207 may read data from and write data to the internal storage 202 in device 200 via controller 201. Embedded processor 203 may access internal storage 202 in removable storage device 200 via controller 201. Embedded processor 203 may boot from embedded ROM 204. The embedded processor 203 may remove SPI from internal storage 202 based on application of removal criteria 205 that are stored in embedded ROM 204. The controller 201 and internal storage 202 may together be referred to as device storage 208, and the embedded processor 203 and embedded ROM 204 may together be referred to as embedded system 209. Operation of device 200 is discussed below with respect to method 300 of FIG. 3.

It is to be understood that the block diagram of FIG. 2 is not intended to indicate that the device 200 is to include all of the components shown in FIG. 2. Rather, the device 200 can include any appropriate fewer or additional components not illustrated in FIG. 2 (e.g., additional memory components, embedded controllers, functional blocks, connections between functional blocks, modules, inputs, outputs, etc.). Further, the embodiments described herein with respect to device 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
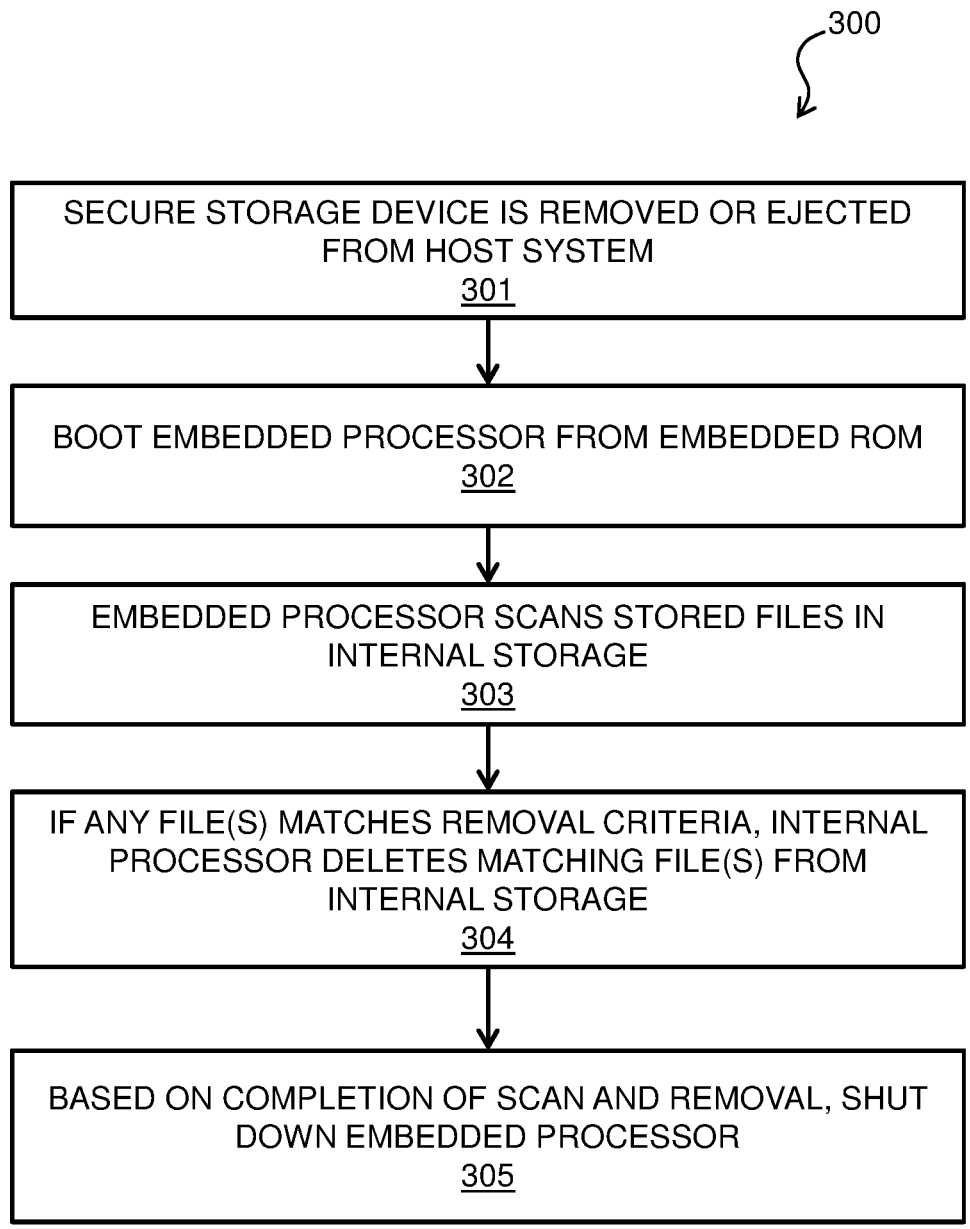
FIG. 3 is a process flow diagram of a method for data scanning and removal for a removable storage device in accordance with one or more embodiments of the present invention.

FIG. 3 is a process flow diagram of a method 300 for data scanning and removal for a removable storage device in accordance with one or more embodiments of the present invention. Method 300 may be implemented in embodiments of a removable storage device 200 of FIG. 2. In block 301 of method 300, a removable storage device 200 is removed or ejected from a host system 207. Removal from the host system 207 may be determined in block 301 based on detecting a loss of power to the device 200. Ejection may be determined in block 301 based on receiving an ejection request from the host system 207 via interface 206. In block 302, embedded processor 203 boots from embedded ROM 204 based on the removal or ejection that occurred in block 301. In embodiments of method 300 in which the device 200 was physically removed from the host system 207 without ejection, the device 200 may be powered by an auxiliary power source starting in block 302. In block 303, the embedded processor 203 scans the internal storage 202 for files that may contain SPI based on removal criteria 205. In block 304, any data in internal storage 202 that are identified as possible SPI, such as files that match removal criteria 205, is removed from the internal storage 202 by the embedded processor 203. In block 305, based on the scanning and removal being complete, the embedded processor 203 shuts down and method 300 ends.

The scanning and removal of potential SPI data as is performed in blocks 303 and 304 may be performed in any appropriate manner. Any files determined to potentially contain SPI may be identified and removed from internal storage 202 by embedded processor 203 in blocks 303 and 304. The removal may include unlinking and overwriting the location of an identified file in some embodiments. In some embodiments, a list of file identifiers corresponding to the removed files may be stored in a predetermined memory location in the internal storage 202. If a file identifier is determined to include SPI, any sensitive portion of the file identifier may be masked in the file identifier list (e.g., replaced with x's or some other character) in block 304.

In some embodiments, the embedded processor 203 may examine the contents of all stored files in internal storage 202 to determine any file that could contain SPI in block 303. In some embodiments, the embedded processor 203 may examine the contents of files having recognized file types for potential SPI information, e.g., identify any patterns matching phone numbers, social security numbers (SSNs), names, address, etc. In some embodiments, the embedded processor 203 may include a neural network that has been trained to recognize SPI patterns within files in block 303. In some embodiments, a neural network that is executed by the embedded processor 203 may be trained using binary and text data to recognize SPI patterns. In some embodiments, the training data may include excerpts of medical records or similar types of data.

In some embodiments, the embedded processor 203 may delete any files in internal storage 202 having a type that is not on a predetermined list of allowed file types, which may be defined in removal criteria 205, in block 304. In some embodiments, the embedded processor 203 may identify and remove any file types that might contain SPI based on file extensions (e.g., .txt, .doc, .ppt, .xls, .odf, etc.). In some embodiments, the embedded processor 203 may check the header of a file to determine the type of a file, rather than relying on the file extension, in block 303. In various embodiments of blocks 303 and 304, the embedded processor 203 may allow only certain types of files on the removable storage device, or may deny specific types of files. A list of file types that are allowed, or not allowed, on the removable storage device 200 may be defined in removal criteria 205 via a one-time programmable (OTP) function of the embedded ROM in the removable storage device in some embodiments. For example, a host system 207 comprising a scientific instrument may only process certain types of files; therefore, a removable storage device 200 for use in conjunction with the host system 207 may only allow the types of files that are processed by the host system; a list of these file types may be stored in removal criteria 205. Any files of other file types may be removed from internal storage 202 by embedded processor 203 based on detection of a file operation involving a disallowed file type by embedded processor 203. In such embodiments, the embedded processor 203 may actively monitor the contents of the internal storage 202 throughout operation of the removable storage device 200, in addition to performing a final scan and removal based on ejection or loss of power as is described by method 300 of FIG. 3.

In some embodiments of method 300, rather than booting the embedded processor 203 based on the removal or ejection of block 302 of method 300, the embedded processor 203 may be operational whenever the device 200 is connected to the host system 207, and the embedded processor 203 may periodically scan the internal storage 202 for SPI during usage of the device 200. In such embodiments, blocks 301 and 303-305 are performed to ensure that a final scan is performed based on removal or ejection of the device 200; however, block 302 is not needed as the embedded processor 203 is already booted at the time of the removal or ejection in such embodiments.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
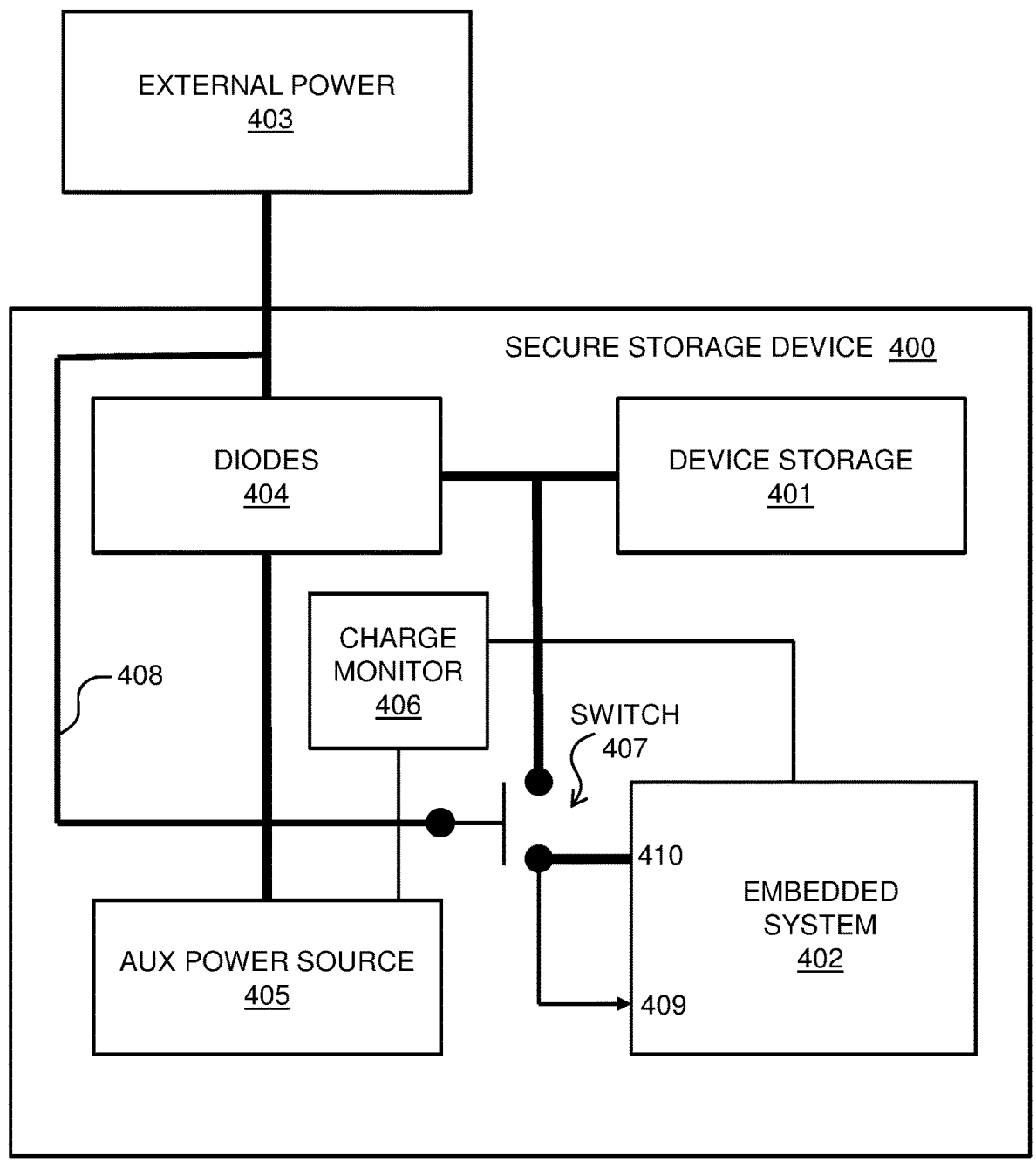
FIG. 4 is a block diagram of a removable storage device including data scanning and removal in accordance with one or more embodiments of the present invention.

FIG. 4 is a block diagram of a removable storage device 400 including data scanning and removal in accordance with one or more embodiments of the present invention. Device 400 illustrates an embodiment of a removable storage device 400 including an auxiliary power source 405, and may correspond to some embodiments of a removable storage device as discussed above with respect to device 200 of FIG. 2 and method 300 of FIG. 3. Device 400 is powered by external power 403 while the device 400 is connected to a host system, which may correspond to host system 207 of FIG. 2. While the device 400 is connected to the external power 403, power is received by diodes 404 in device 400, which may comprise ORing diodes in some embodiments. The diodes 404 provide the power from external power 403 to device storage 401 (which may correspond to device storage 208 of FIG. 2) and to auxiliary power source 405. Auxiliary power source 405 may include any appropriate power storage device, including but not limited to a battery or a capacitor, such as a supercapacitor (e.g., a Goldcap). Charge monitor 406 monitors the charge level of auxiliary power source 405. Charge monitor 406 is in communication with embedded system 402. Embedded system 402 may correspond to embedded system 209 of FIG. 2.

Switch 407 is controlled based on the connection of device 400 to external power 403. When the device 400 is disconnected from external power 403, switch 407 closes based on the loss of power at gate signal 408, and auxiliary power source 405 powers device storage 401 and embedded system 402 via switch 407. Embedded system 402 receives power from switch 407 via power input 410, and boots based on receiving power at enable input 409 from the closed switch 407. When the embedded system 402 boots based on the closing of switch 407, the embedded system 402 may scrub SPI from the device storage 401. The scrubbing of SPI from device storage 401 by embedded system 402 may be performed as described above with respect to blocks 303 and 304 of method 300 of FIG. 3. Operation of device 400 is discussed below with respect to method 500 of FIG. 5.

It is to be understood that the block diagram of FIG. 4 is not intended to indicate that the device 400 is to include all of the components shown in FIG. 4. Rather, the device 400 can include any appropriate fewer or additional components not illustrated in FIG. 4 (e.g., additional memory components, embedded controllers, functional blocks, connections between functional blocks, modules, inputs, outputs, etc.). Further, the embodiments described herein with respect to device 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 5:
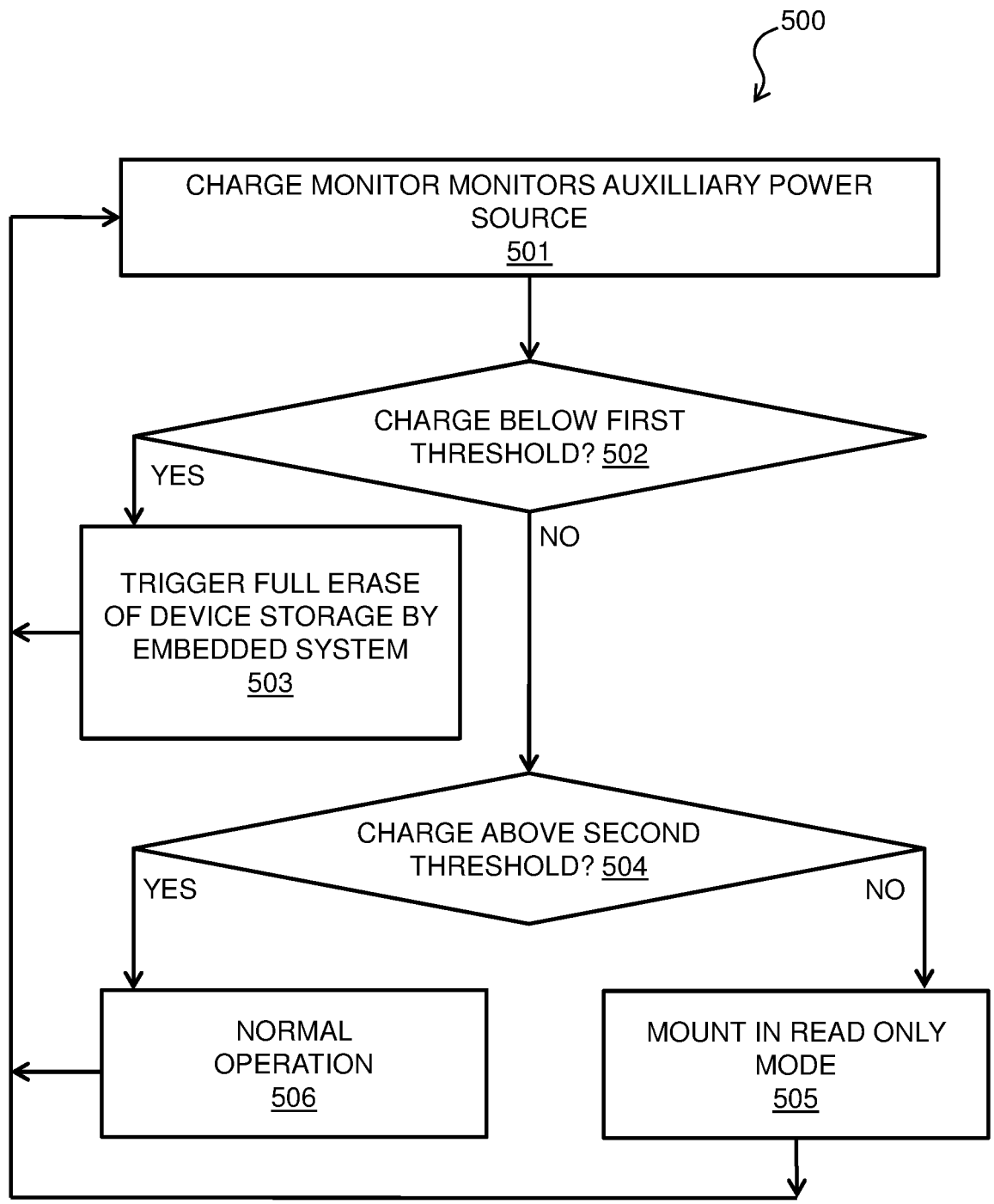
FIG. 5 is a process flow diagram of another method for data scanning and removal for a removable storage device in accordance with one or more embodiments of the present invention.

FIG. 5 is a process flow diagram of another method 500 for data scanning and removal for a removable storage device in accordance with one or more embodiments of the present invention. Method 500 may be implemented in device 400 of FIG. 4. In block 501, during operation of the device 400, including reads and writes to the device storage 401 by a host system, charge monitor 406 monitors the charge level of auxiliary power source 405. In block 502, it is determined based on charge monitor 406 whether the charge level of the auxiliary power source 405 is below a first threshold. The first threshold of block 502 may correspond to a minimum amount of charge required to perform the scanning and removal of blocks 303 and 304 of method 300 of FIG. 3. The determination of block 502 may be made by embedded system 402. If it is determined in block 502 that the charge level of the auxiliary power source 405 is below the first threshold, flow proceeds from block 502 to block 503. In block 503, a full erase of the data in device storage 401 is performed by the embedded system 402. Flow then proceeds from block 503 back to block 501.

If it is determined in block 502 that the charge level of the auxiliary power source 405 is not below the first threshold, flow proceeds from block 502 to block 504. In block 504, it is determined based on charge monitor 406 whether the charge level of the auxiliary power source 405 is above a second threshold. The second threshold of block 504 may be higher than the first threshold. The determination of block 504 may be made by embedded system 402. If it is determined in block 504 that the charge level of the auxiliary power source 405 is not above the second threshold, flow proceeds from block 504 to block 505. In block 505, the device 400 may mount in a read-only mode. The determination of block 504 may indicate that the charge capacity of the auxiliary power source 405 is below the second threshold, which may be an end of life condition for the device 400. In some embodiments, the device 400 may be replaced (or the auxiliary power source 405 in the device 400 may be replaced) based on repeated iterations of blocks 504 and 505 of method 500 of FIG. 5. Flow then proceeds from block 505 back to block 501.

If it is determined in block 504 that the charge level of the auxiliary power source 405 is above the second threshold, flow proceeds from block 504 to block 506. In block 506, normal operation of the device 400 proceeds. Flow then proceeds from block 506 back to block 501. Method 500 of FIG. 5 may be performed repeatedly by embedded system 402 based on input from the charge monitor 406 throughout operation of the device 400.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
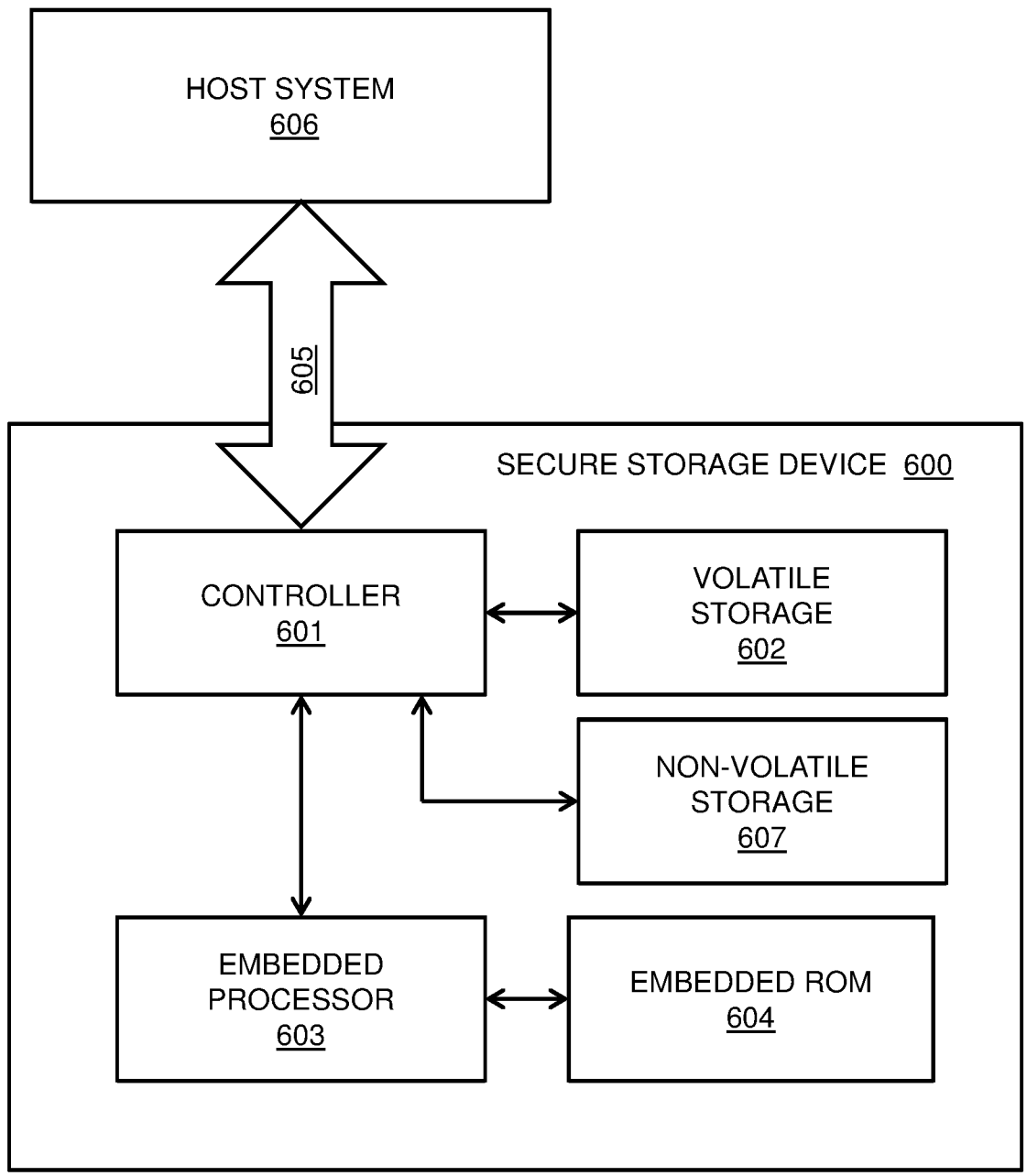
FIG. 6 is a block diagram of a removable storage device including data scanning and removal in accordance with one or more embodiments of the present invention.

FIG. 6 is a block diagram of a removable storage device 600 including data scanning and removal in accordance with one or more embodiments of the present invention. Device 600 is used in conjunction with a host system 606, which may include any elements of computer system 100 of FIG. 1. Device 600 receives power from host system 606 via interface 605. Device 600 includes a controller 601 that is in communication with volatile storage 602 and non-volatile storage 607. Volatile storage 602 and non-volatile storage 607 may be approximately the same size in some embodiments. Device 600 further includes an embedded processor 603 in communication with embedded ROM 604. While the device 600 is connected to the host system 606, the host system 606 may read and write data to the volatile storage 602. Based on receiving an ejection request from a user via the host system 606 and interface 605, the embedded ROM 604 may scan the data in the volatile storage 602 for SPI, and write any data that is not identified as SPI from volatile storage 602 to non-volatile storage 607. Only data in the non-volatile storage 607 may be preserved after the device 600 is removed from the host system 606; the volatile storage 602 is erased upon loss of power. Operation of device 600 is discussed in detail below with respect to method 700 of FIG. 7.

It is to be understood that the block diagram of FIG. 6 is not intended to indicate that the device 600 is to include all of the components shown in FIG. 6. Rather, the device 600 can include any appropriate fewer or additional components not illustrated in FIG. 6 (e.g., additional memory components, embedded controllers, functional blocks, connections between functional blocks, modules, inputs, outputs, etc.). Further, the embodiments described herein with respect to device 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 7:
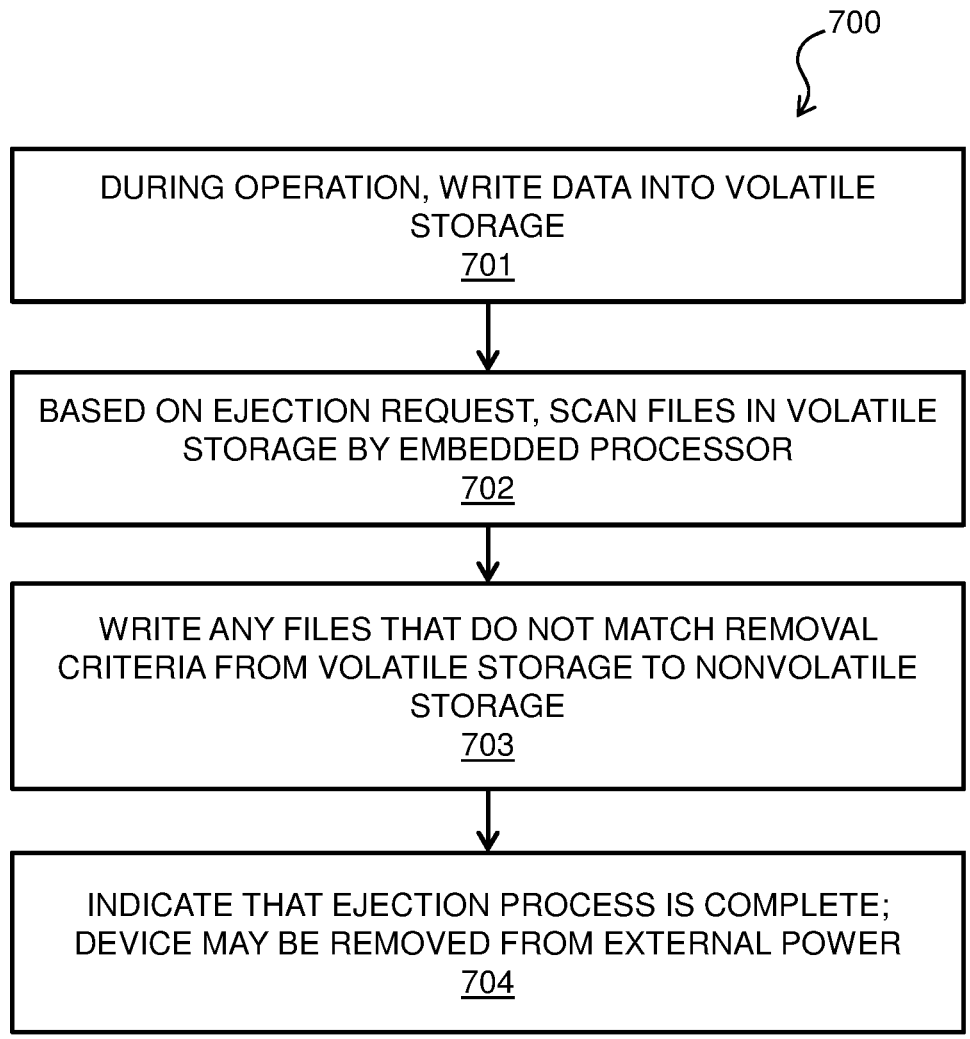
FIG. 7 is a process flow diagram of another method for data scanning and removal for a removable storage device in accordance with one or more embodiments of the present invention.

FIG. 7 is a process flow diagram of another method 700 for data scanning and removal for a removable storage device in accordance with one or more embodiments of the present invention. Method 700 is discussed with respect to device 600 of FIG. 6. In block 701, during operation of device 600, the host system 606 writes data to volatile storage 602 in device 600 via interface 605 and controller 601. In block 702, an ejection request is received from the host system 606 by device 600 via interface 605. The ejection request may be made by a user of the host system 606. Based on receiving the ejection request in block 702, the embedded processor 603 scans the data in the volatile storage 602 for the presence of SPI based on any appropriate removal criteria (e.g., as described above with respect to removal criteria 205 of FIG. 2). SPI may be determined in block 702 as discussed above with respect to block 303 of method 300. In block 703, the embedded processor 603 writes any data from volatile storage 602 that was determined not to be SPI in block 702 to non-volatile storage 607. In block 704, based on the writing of non-SPI data from volatile storage 602 to non-volatile storage 607 being complete, the device 600 indicates to the host system 606 that the ejection process is complete, and it is safe for a user to remove the device 600 from the host system 606. Data in the non-volatile storage 607 will be preserved in the device 600 after removal from the power provided by the host system 606, while data in volatile storage 602, including any SPI that was not written to the non-volatile storage 607, will be lost upon loss of external power to device 600. In embodiments of a removable storage device that implement method 700, an auxiliary power source, as discussed above with respect to FIGS. 4-5, is not needed.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

Figure 8:
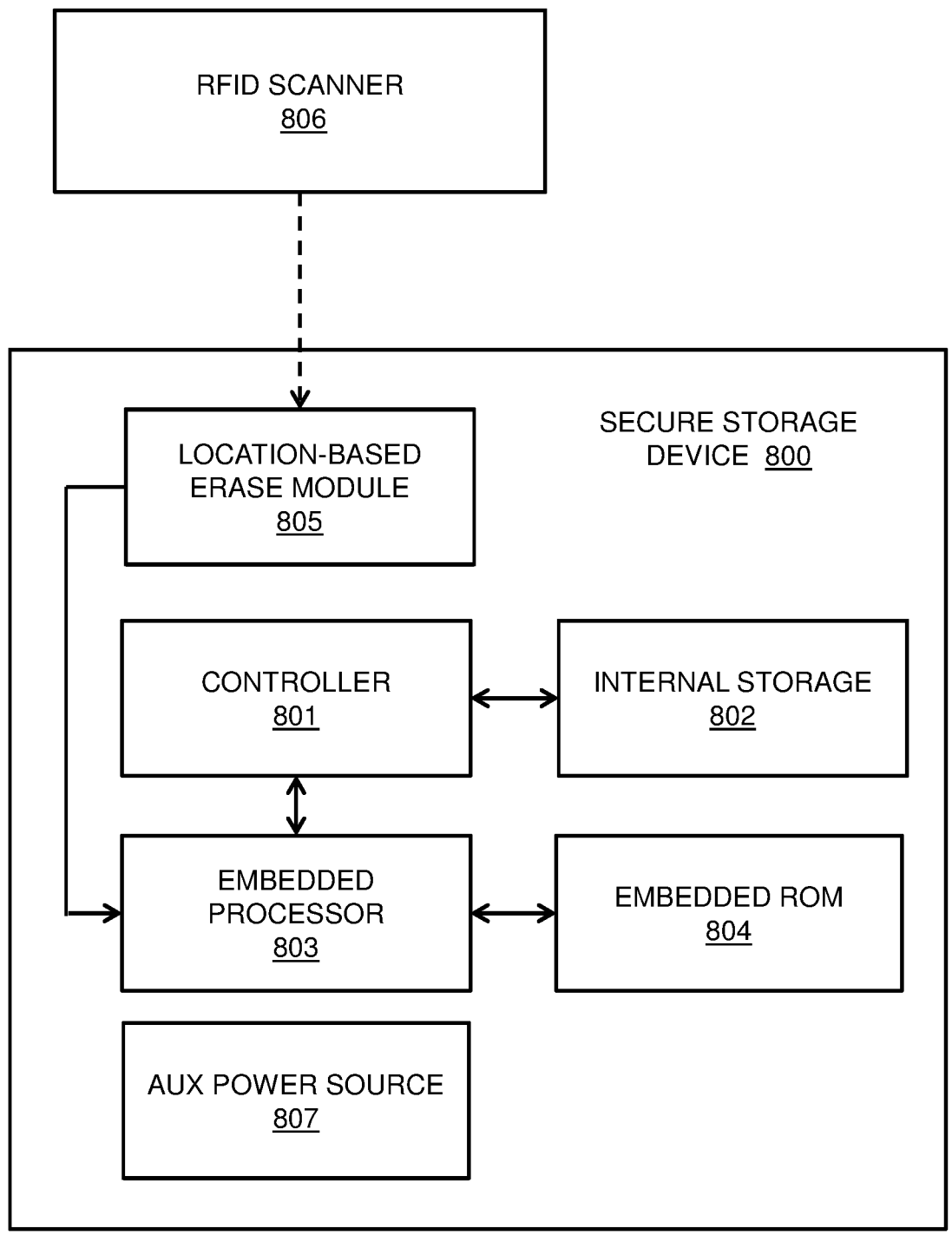
FIG. 8 is a block diagram of a removable storage device including data scanning and removal in accordance with one or more embodiments of the present invention.

FIG. 8 is a block diagram of a removable storage device 800 in accordance with one or more embodiments of the present invention. Device 800 may be used in conjunction with any appropriate host system, such as computer system 100 of FIG. 1. Device 800 includes a controller 801, internal storage 802, embedded processor 803, and embedded ROM 804, which may correspond to controller 201, internal storage 202, embedded processor 203, and embedded ROM 204 of device 200 of FIG. 2. Device 800 further includes a location-based erase module 805 that is in communication with embedded processor 803. Location-based erase module 805 may receive periodic signals (e.g., pings) from a radio-frequency identification (RFID) scanner 806. Missed signals may cause the location-based erase module 805 to trigger an erase of the data in internal storage 802 by embedded processor 803. In some embodiments of device 800, the location-based erase module 805 may include a global positioning system (GPS) module; in such embodiments, the device 800 may not receive signals from an RFID scanner such as RFID scanner 806. Device 800 further includes an auxiliary power source 807 that may power any elements of the device 800 when the device 800 is not connected to external power, including location-based erase module 805 and embedded processor 803. Embodiments of the auxiliary power source 807 may include a charge monitor to implement the first and second charge thresholds described above with respect to device 400 of FIG. 4 and method 500 of FIG. 5. Operation of device 800 is discussed below with respect to method 900 of FIG. 9.

It is to be understood that the block diagram of FIG. 8 is not intended to indicate that the device 800 is to include all of the components shown in FIG. 8. Rather, the device 800 can include any appropriate fewer or additional components not illustrated in FIG. 8 (e.g., additional memory components, embedded controllers, functional blocks, connections between functional blocks, modules, inputs, outputs, etc.). Further, the embodiments described herein with respect to device 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 9:
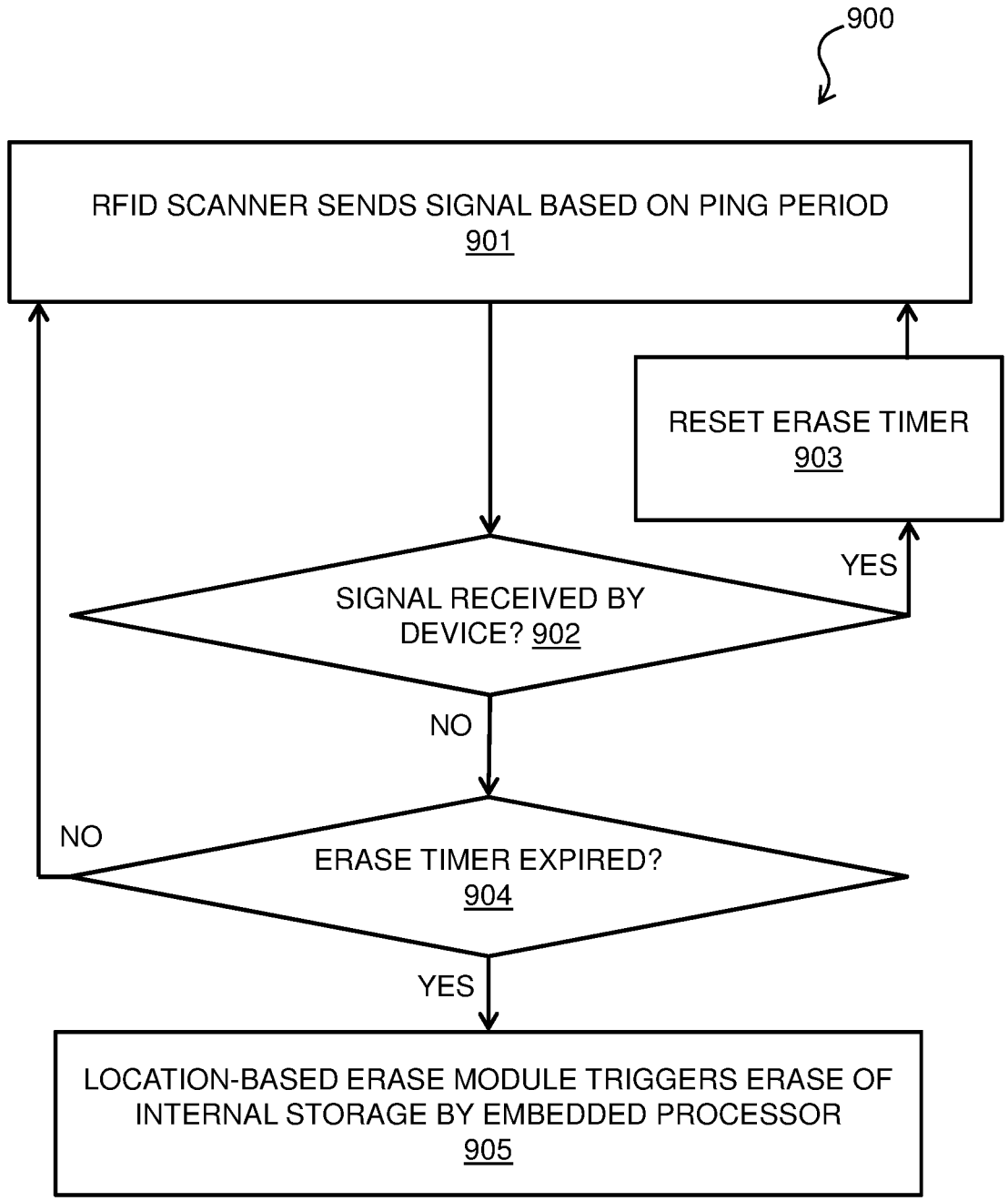
FIG. 9 is a process flow diagram of another method for data scanning and removal for a removable storage device in accordance with one or more embodiments of the present invention.

FIG. 9 is a process flow diagram of another method for data scanning and removal for a removable storage device in accordance with one or more embodiments of the present invention. Method 900 is discussed with respect to device 800 of FIG. 8. In block 901, an RFID scanner 806 sends out a signal (e.g., a ping) based on a ping period. The ping period may be any appropriate amount of time. The signal may be received by any device having an RFID receiver that is within a transmission distance of the RFID scanner 806, such as location-based erase module 805 in device 800. In block 902, it is determined by location-based erase module 805 whether a signal from the RFID scanner 806 has been received. If it is determined in block 902 that a signal from the RFID scanner 806 has been received, flow proceeds from block 902 to block 903, in which an erase timer that is maintained by the location-based erase module 805 is reset. The erase timer may be reset to any appropriate amount of time; in some embodiments, the erase timer may be set based on a multiple of the ping period. The erase timer counts down throughout operation of method 900. Flow proceeds from block 903 back to block 901, in which the RFID scanner 806 continues to send out signals.

If it is determined in block 902 that no signal has been received by the location-based erase module 805, flow proceeds from block 902 to block 904, in which it is determined whether the erase timer that is maintained by location-based erase module 805 has expired. If it is determined in block 904 that the erase timer has not expired, flow proceeds from block 904 back to block 901. Blocks 901, 902, 903, and 904 are repeated throughout operation of the device 800; whenever a signal is received by location-based erase module 805 from RFID scanner 806 in block 903, the erase timer is reset in block 903.

If it is determined in block 904 that the erase timer has expired, flow proceeds from block 904 to block 905, in which the location-based erase module 805 triggers the embedded processor 803 to erase all the data in internal storage 802. Expiration of the erase timer, as was determined in block 904, may indicate that the device 800 is outside of the physical radius that is prescribed by the RFID scanner 806 (e.g., the device 800 has been removed from a laboratory in which the RFID scanner 806 is located).

In some embodiments of a device 800, in which the location-based erase module 805 includes a GPS module, the location-based erase module 805 may trigger an erase of all of the data in the internal storage 802, as is performed in block 905 of method 900 of FIG. 9, based on the GPS module in the location-based erase module 805 indicating that the device 800 is located outside of a prescribed physical area. The prescribed physical area may be set in the location-based erase module 805 and compared to location data that is generated by the GPS module.

The process flow diagram of FIG. 9 is not intended to indicate that the operations of the method 900 are to be executed in any particular order, or that all of the operations of the method 900 are to be included in every case. Additionally, the method 900 can include any suitable number of additional operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
a removable storage device comprising an embedded processor configured to:
boot from an embedded read-only memory (ROM) of the removable storage device;
scan an internal storage of the removable storage device to identify a first file in the internal storage that matches removal criteria defined in the embedded ROM and a second file in the internal storage that does not match the removal criteria defined in the embedded ROM; and
remove the identified first file and not the second identified file from the internal storage of the removable storage device,
wherein the scanning and removing are performed when the removable storage device is disconnected from an external power source.

2. The system of claim 1, wherein:
the scanning comprises determining, based on the removal criteria, that the first file comprises sensitive personal information (SPI); and
the embedded processor is booted based on one of receiving an ejection request from a host system by the removable storage device, and a removal of the removable storage device from the external power source.

3. The system of claim 1, wherein the internal storage comprises a volatile memory and a non-volatile memory, and the scanning and removing comprises:
based on receiving an ejection request from a host system by the removable storage device, determining the first file in the volatile memory that matches the removal criteria and the second file in the volatile memory that does not match the removal criteria;
writing the second file from the volatile memory to the non-volatile memory, wherein the first file is not written from the volatile memory to the non-volatile memory; and
based on removal of the removable storage device from the host system, preserving the second file in the non-volatile memory, wherein the first file is not preserved in the volatile memory after the removal of the removable storage device from the host system.

4. The system of claim 1, wherein the system further comprises an auxiliary power source, wherein, based on the removable storage device being disconnected from the external power source, the auxiliary power source powers the embedded processor during the scanning and removing.

5. The system of claim 4, wherein the system further comprises a charge monitor corresponding to the auxiliary power source, and the embedded processor is further configured to:
determine, based on the charge monitor, whether a charge of the auxiliary power source is below a first threshold;
based on determining that the charge of the auxiliary power source is below the first threshold, perform a full erase of the internal storage;
based on determining that the charge of the auxiliary power source is not below the first threshold, determine whether the charge of the auxiliary power source is above a second threshold, wherein the second threshold is higher than the first threshold; and
based on determining that the charge of the auxiliary power source is not above the second threshold, mount the internal storage in a read-only mode.

6. The system of claim 1, wherein the system further comprises a location-based erase module configured to:
based on receiving a signal from a scanner, reset an erase timer; and
based on expiration of the erase timer, trigger the embedded processor to perform a full erase of the internal storage.

7. The system of claim 1, wherein the system further comprises a location-based erase module configured to:
determine a location of the removable storage device based on a global positioning system (GPS) module;
compare the determined location to a predetermined area; and
based on the determined location being outside of the predetermined area, trigger the embedded processor to perform a full erase of the internal storage.

8. A computer-implemented method, comprising:
booting an embedded processor of a removable storage device from an embedded read-only memory (ROM) of the removable storage device;
scanning an internal storage of the removable storage device by the embedded processor to identify a first file in the internal storage that matches removal criteria defined in the embedded ROM and a second file in the internal storage that does not match the removal criteria defined in the embedded ROM; and
removing the identified first file and not the second identified file from the internal storage of the removable storage device by the embedded processor,
wherein the scanning and removing are performed when the removable storage device is disconnected from the external power source.

9. The computer-implemented method of claim 8, wherein:
the scanning comprises determining, based on the removal criteria, that the first file comprises sensitive personal information (SPI); and
the embedded processor is booted based on one of receiving an ejection request from a host system by the removable storage device, and a removal of the removable storage device from the external power source.

10. The computer-implemented method of claim 8, wherein the internal storage comprises a volatile memory and a non-volatile memory, and the scanning and removing comprises:
based on receiving an ejection request from a host system by the removable storage device, determining the first file in the volatile memory that matches the removal criteria and the second file in the volatile memory that does not match the removal criteria;
writing the second file from the volatile memory to the non-volatile memory, wherein the first file is not written from the volatile memory to the non-volatile memory; and
based on removal of the removable storage device from the host system, preserving the second file in the non-volatile memory, wherein the first file is not preserved in the volatile memory after the removal of the removable storage device from the host system.

11. The computer-implemented method of claim 8, wherein the removable storage device further comprises an auxiliary power source, and, based on the removable storage device being disconnected from the external power source, the embedded processor is powered by the auxiliary power source during the scanning and removing.

12. The computer-implemented method of claim 11, wherein the removable storage device further comprises a charge monitor corresponding to the auxiliary power source, and the method further comprising:
- determining, based on the charge monitor, whether a charge of the auxiliary power source is below a first threshold;
- based on determining that the charge of the auxiliary power source is below the first threshold, performing a full erase of the internal storage;
- based on determining that the charge of the auxiliary power source is not below the first threshold, determining whether the charge of the auxiliary power source is above a second threshold, wherein the second threshold is higher than the first threshold; and
- based on determining that the charge of the auxiliary power source is not above the second threshold, mounting the internal storage in a read-only mode.

13. The computer-implemented method of claim 8, comprising:
- based on receiving a signal from a scanner by the removable storage device, resetting an erase timer; and
- based on expiration of the erase timer, performing a full erase of the internal storage.

14. The computer-implemented method of claim 8, comprising
- determining a location of the removable storage device based on a global positioning system (GPS) module;
- comparing the determined location to a predetermined area; and
- based on the determined location being outside of the predetermined area, performing a full erase of the internal storage.

15. A computer program product comprising:
- a computer readable storage medium having program instructions embodied therewith, the program instructions when executed by an embedded processor of a removable storage device cause the embedded processor to perform operations comprising:
- booting the embedded processor from an embedded read-only memory (ROM) of the removable storage device;
- scanning an internal storage of the removable storage device to identify a first file in the internal storage that matches removal criteria defined in the embedded ROM and a second file in the internal storage that does not match the removal criteria defined in the embedded ROM; and
- removing the identified first file and not the second identified file from the internal storage of the removable storage device,
- wherein the scanning and removing are performed when the removable storage device is disconnected from the external power source.

16. The computer program product of claim 15, wherein:
- the scanning comprises determining, based on the removal criteria, that the first file comprises sensitive personal information (SPI); and
- the embedded processor is booted based on one of receiving an ejection request from a host system by the removable storage device, and a removal of the removable storage device from the external power source.

17. The computer program product of claim 15, the internal storage comprising a volatile memory and a non-volatile memory, and wherein the scanning and removing comprises:
- based on receiving an ejection request from a host system by the removable storage device, determining the first file in the volatile memory that matches the removal criteria and the second file in the volatile memory that does not match the removal criteria;
- writing the second file from the volatile memory to the non-volatile memory, wherein the first file is not written from the volatile memory to the non-volatile memory; and
- based on removal from the host system, preserving the second file in the non-volatile memory, wherein the first file is not preserved in the volatile memory after the removal from the host system.

18. The computer program product of claim 15, wherein the removable storage device further comprises an auxiliary power source, and, based on the removable storage device being disconnected from the auxiliary power source powers the embedded processor during the scanning and removing.

19. The computer program product of claim 18, wherein the removable storage device further comprises a charge monitor corresponding to the auxiliary power source, and the operations further comprise:
- determining, based on the charge monitor, whether a charge of the auxiliary power source is below a first threshold;
- based on determining that the charge of the auxiliary power source is below the first threshold, performing a full erase of the internal storage;
- based on determining that the charge of the auxiliary power source is not below the first threshold, determining whether the charge of the auxiliary power source is above a second threshold, wherein the second threshold is higher than the first threshold; and
- based on determining that the charge of the auxiliary power source is not above the second threshold, mounting the internal storage in a read-only mode.

20. The computer program product of claim 15, the operations further comprising:
- based on receiving a signal from a scanner by the removable storage device, resetting an erase timer; and
- based on expiration of the erase timer, performing a full erase of the internal storage.

21. The computer program product of claim 15, the operations further comprising:
- determining a location of the removable storage device based on a global positioning system (GPS) module;
- comparing the determined location to a predetermined area; and
- based on the determined location being outside of the predetermined area, performing a full erase of the internal storage.

* * * * *